June 22, 1943. J. W. OVERBEKE 2,322,658
VALVE
Filed May 9, 1941
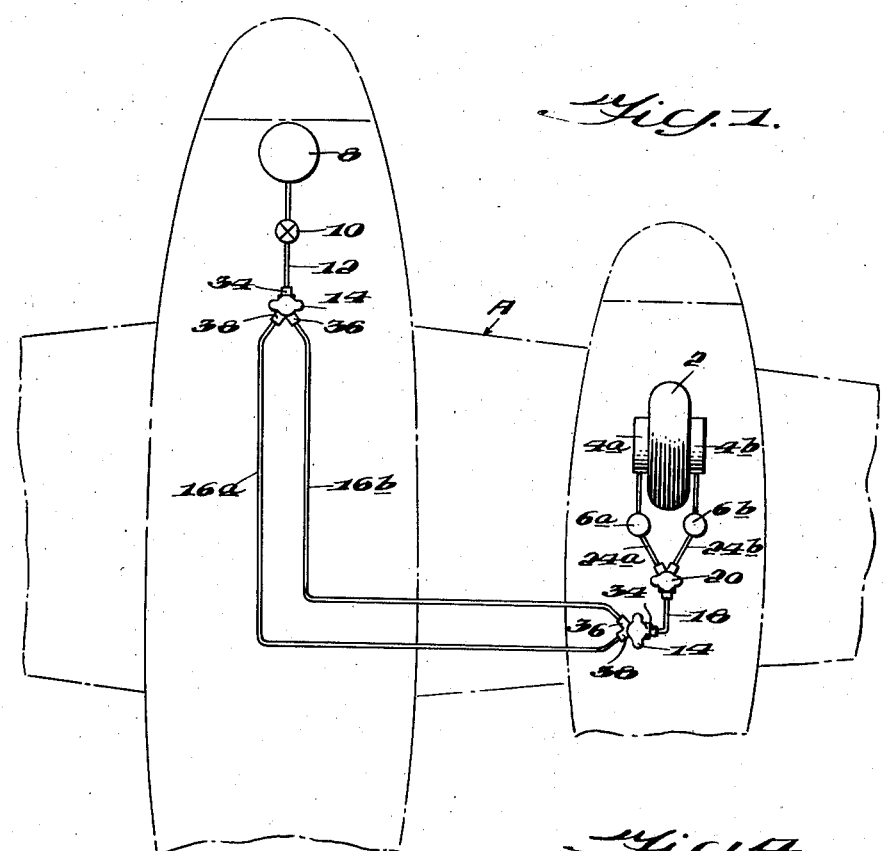
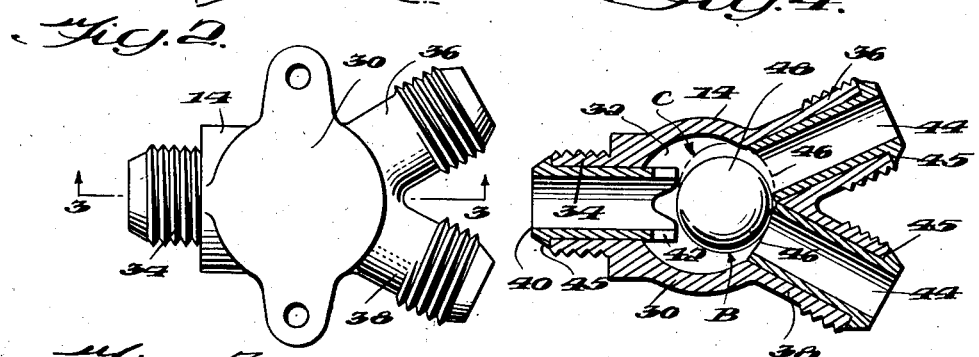
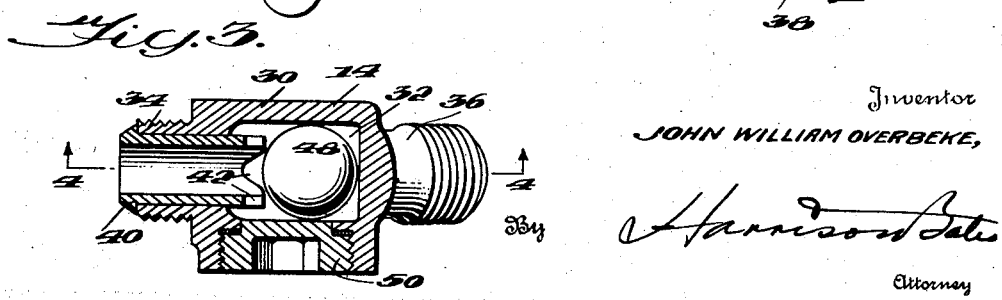
Inventor
JOHN WILLIAM OVERBEKE,
By Harrison Gates
Attorney Patented June 22, 1943

2,322,658

UNITED STATES PATENT OFFICE 2,322,658

VALVE

John William Overbeke, Anneslie, Md., assignor to The Glenn L. Martin Company, Baltimore, Md.

Application May 9, 1941, Serial No. 392,675

3 Claims. (Cl. 137—166)

This invention is directed to the maintenance of fluid flow through hydraulic pressure lines. More particularly the invention is directed to the provision of automatic valve means to insure a pressure flow through one pressure conduit if the second pressure conduit of a dual line pressure system is broken.

It has been found desirable in aircraft construction to provide a plurality of conduits between a control point and the mechanism to be actuated, for example between the pilots' control panel and the hydraulically actuated brakes for the wheels of the aircraft. Should one conduit become broken the other conduit is relied upon for transmitting the operating fluid pressure. Some means, of course, must be provided for shutting off the fluid flowing in a broken conduit.

It is an object of this invention to construct a very simple valve for automatically and substantially instantaneously shutting off the flow of fluid into one conduit and directing the flow of fluid into a second conduit should the first conduit become broken.

Another object of the invention is to provide a very simple valve structure which has but one movable element and which requires substantially no maintenance.

Generally these objects of the invention are obtained by placing a valve at the intersection of two separate conduits joined to a single supply conduit. This valve consists of a ball which in normal operation leaves both conduits open for the passage of fluid therethrough, but is displaced by the pressure differential resulting from a break in one conduit so that it is seated over the inlet to that conduit and thus prevents the passage of fluid through that conduit, while leaving the other conduit open.

The means by which the objects of the invention are obtained are more fully shown in the accompanying drawing, in which:

Fig. 1 is a diagrammatic plan view of an aircraft showing a fluid pressure system for the hydraulically operated brakes;

Fig. 2 is a plan view of one of the novel valves;

Fig. 3 is a cross-sectional view on the line 3—3, Fig. 2; and

Fig. 4 is a cross-sectional view on the line 4—4, Fig. 3.

The invention is described with reference to the control lines for operating a hydraulic brake mechanism for the wheels of an aircraft, although it is to be understood that the invention is applicable to the operation of any mechanism employing hydraulic power. In Fig. 1 a portion of an aircraft A and a wheel 2 are diagrammatically illustrated. Dual brakes 4a and 4b for wheel 2 are provided with hydraulically operating mechanisms 6a and 6b, respectively.

Normally the hydraulic pressure for operating mechanisms 6a and 6b is supplied from a source 8, such as a pump, through a control valve 10 located in the body of the aircraft, through a single conduit extending from valve 10 to mechanisms 6a and 6b. As indicated, this conduit would extend from the body of the aircraft into the wing structure and engine nacelle, and should this single conduit be broken the brakes would become inoperative. Consequently in the instant invention, from valve 10 and pipe 12 a valve 14 is inserted from which dual pipes 16a and 16b are lead through separate paths into the engine nacelle, where they are rejoined through a similar valve 14 into a single passage 18, which orinarily is in the form of a flexible hose. From passage 18 and through fitting 20, separate lines 24a and 24b communicate, respectively, to the hydraulic mechanisms 6a and 6b.

The structure of valve 14 comprises an essential portion of the invention and is illustrated in detail in Figs. 2, 3 and 4. Generally the valve is composed of a housing 30 within which is a chamber 32. A single branch 34 communicates with one side of the chamber 32 while two diverging branches 36 and 38 communicate with the opposite side of chamber 32. The exterior of each of these branches is threaded as shown to form one part of a coupling. Branch 34 has a sleeve 40 inserted therein, which sleeve has notches 42 cut in its innermost end. Branches 36 and 38 each have a sleeve 44 inserted therein, the inner end 46 of each of which is shaped to provide an accurate seat for a ball 48 contained within chamber 32. The outward end of each sleeve has a flange 45 seated upon the outer end of its respective branch.

One side of housing 30 is solid, while the opposite is furnished with an opening large enough for the insertion of ball 48 into chamber 32, this opening being closed by a threaded plug 50. The distance between the inner end of plug 50 and the opposite wall of chamber 32 is substantially equal to the diameter of ball 48 so that movement of the ball is confined to a single plane. The ball is free however to move into seated position upon end 46 of either sleeve 44.

The operation of valve 14 is as follows:

When both conduits 16a and 16b are intact and open, fluid from source 8 and conduit 12 passes through branch 34, and by a jet action keeps the ball 48 in the position B shown in Fig. 4 so that fluid pressure is transmitted through both branches 36 and 38 of the valve into conduits 16a and 16b. Should one line, for example line 16b, break or leak the pressure in branch 36 would drop, thus causing the ball under the fluid pressure in the chamber to move from position B to position C over sleeve 44 and be seated upon the edge 46 as shown by dotted lines. Fluid pressure would then be transmitted through branch 38 and line 16a. The notches 42 in sleeve 40 prevent the ball from having any check valve function and insure that fluid can always enter into the chamber 32.

The valve 14 between lines 16a and 16b and pipe 18 has a similar function inasmuch as should the line 16b break the fluid pressure through branch 38 from line 16a would cause the ball to be seated upon edge 46 in position C and thus no fluid would be lost from chamber 32 through branch 36. As before stated notches 42 would prevent ball 48 from acting as a check valve against sleeve 40.

It is obvious that if desired the valve 20 could be made similar to the valve 14 for all the functions thereof.

The invention thus provides a very simple valve means for automatically shutting off one fluid conduit in a dual line pressure system should it become broken so that a pressure loss occurs therein. The ball 48 constitutes the only movable part and as the fluid itself has lubricating qualities, no maintenance problems arise. The valve is quick and sure in its operation and insures that if one pressure conduit is damaged the other conduit will automatically carry the fluid.

Although the materials used in making the valve may be varied within the spirit of the invention, in a preferred form the housing and ball are made of aluminum alloys while, for the purpose of obtaining accurate ball seating edges 46, the sleeves are made of steel.

Having now described the means by which the objects of the invention are obtained, I claim:

1. A ball valve for use with a pair of lines in which equal flow is to be effected comprising a housing enclosing a substantially cylindrical chamber, the axial length of said cylindrical chamber being slightly larger than the diameter of the ball, the diameter of the chamber being approximately equal to one and one-half ball diameters, a radially extending inlet passage formed in one side of the housing, a pair of radially extending outlet passages formed in the opposite side of the housing the axes of which form an acute angle and are symmetrically placed with respect to the axis of said first mentioned passage, a lightweight ball in the chamber, said ball being centered in the chamber by jet action of the fluid streams flowing through the passages during normal flow, said ball being actuated by excessive flow to close the passage through which excessive flow occurs.

2. A ball valve for use with a pair of lines in which equal flow is to be effected, comprising a housing enclosing a substantially cylindrical chamber, a radially extending inlet passage formed in one side of the housing, a pair of radially extending outlet passages formed in the opposite side of the housing, the axes of which form an acute angle and are symmetrically placed with respect to the axis of said first mentioned passage, a tube inserted in the first mentioned passage having a serrated inner end extending into the chamber, a pair of tubes inserted in the above mentioned pair of passages, the inner ends of which are substantially flush with the chamber wall and form valve seats, a lightweight ball valve in the chamber, the diameter of which is slightly less than the axial length of the chamber, the diameter of said chamber being approximately equal to one and one-half ball diameters, the ball being centered by jet action of fluid streams flowing equally through the pair of passages, said ball being actuated by excessive flow to close the entrance to that passage having the excessive flow.

3. A ball valve for use with a pair of lines in which equal flow is to be effected comprising a housing enclosing a substantially cylindrical chamber, a radially extending inlet passage formed in one side of the housing, a pair of radially extending outlet passages formed in the opposite side of the housing, the axes of which form an acute angle and are symmetrically placed with respect to the axis of said first mentioned passage, a lightweight ball valve in the chamber, the diameter of which is slightly less than the axial length of the chamber, the diameter of the chamber is of such a size relative to the size of the ball that jet action of the fluid flow will be effected so as to center the ball with respect to the outlet passages and produce equal flow therefrom during normal flow conditions, and closing the entrance of one of said passages when excessive flow through the associated passage occurs.

JOHN WILLIAM OVERBEKE.